Dec. 11, 1923.
M. M. DESSAU
TIRE
Filed Oct. 29, 1923
1,476,878
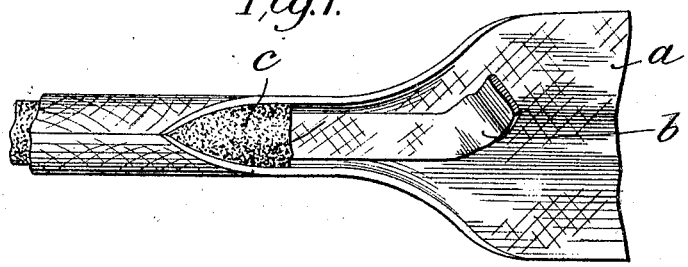
Fig.1.
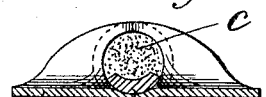
Fig.2.
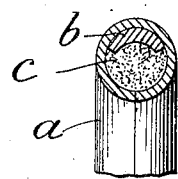
Fig.3.
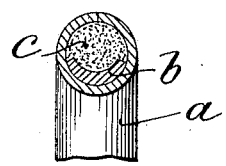
Fig.4.
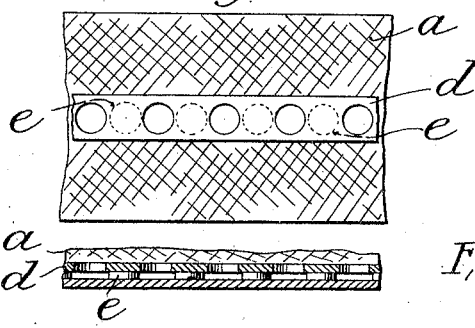
Fig.5.
Fig.6.
INVENTOR
Morland Michele Dessau
By Dowell and Dowell
his Attorneys Patented Dec. 11, 1923.

1,476,878

UNITED STATES PATENT OFFICE.

MORLAND MICHOLL DESSAU, OF LONDON, ENGLAND.

TIRE.

Application filed October 29, 1923. Serial No. 671,558.

*To all whom it may concern:*

Be it known that I, MORLAND MICHOLL DESSAU, a citizen of the United States of America, residing at London, England, have invented Tires, of which the following is a specification.

The object of the present invention is to simplify and cheapen the cost of manufacturing rubber tires more particularly for perambulators, mail carts, foot cycles and the like.

With this object in view a tire according to the invention is built up of natural smoked sheet plantation or crêpe rubber which after being cut stripwise is caused to assume a more or less circular shape in cross section and may subsequently be treated by the Peachey cold vulcanization process. Such a tire may consist of strip material as referred to alone or used in conjunction with a filling material of any suitable character such as spongy rubber.

For example a simple form of tire may be produced by superposing upon a strip of rubber as referred to a second strip narrower in width, the margins of the wider strip being turned in or rolled over say a length of spongy rubber, so as to enclose the same and inner rubber strip and the edges united. A length of such composite character may be joined in suchwise that the inner strip forms a backing to the tread which it serves to reinforce or such strip may if preferred be adjacent to the wheel rim to which the tire is applied. To prevent stretching, a length of suitable fabric or material may be united to the exterior of the tire or embedded therein in the course of manufacture.

The surface of rubber sheeting of the kind referred to from which the strips may be cut is usually of a crenellated or cellular form which is of pleasing appearance and renders the tire non-skidding. Where a plurality of layers of this material are employed it will be obvious that as one wears, the surface of a succeeding layer presents the same non-skid properties. It will thus be seen that various advantages are obtained and without the necessity of employing any moulding apparatus.

In some cases the inner strip may be punched with a series of holes thereby forming air cavities and if desired the discs or pieces of rubber removed in the act of punching of the strip may be interposed between the inner and outer strips so that the inner strip is virtually suspended at intervals in its length.

If the inner strip be initially secured to the outer strip by a chemical process or by means of a solution, such as glue, the outer strip is given an inward curl in the direction required thereby facilitating the completion of the tire.

In the accompanying drawings Fig. 1 is a view illustrating one way of manufacturing a pram tire according to the invention, Fig. 2 being an end view corresponding thereto. Fig. 3 is a cross section showing one way in which the tire can be mounted upon a rim and Fig. 4 is a similar view of an alternative way of using the tire. Fig. 5 is a plan view and Fig. 6 a longitudinal section of a modification.

As shown in Figs. 1 to 4, $a$ is a strip of natural smoked sheet or plantation rubber to which is first secured a narrow strip $b$ of similar material. Such a composite strip is then passed through a former together with a filling $c$ of spongy rubber so that the edges of the strip $a$ are turned in to enclose the filling $c$.

In Fig. 3 the strip $b$ is adjacent to the tread whilst the seam in the strip $a$ is seated upon the rim. In Fig. 4 the tire is fitted in the reverse manner, the seam being in the tread and the strip $b$ adjacent to the rim.

In Figs. 5 and 6 the strip $a$ is shown as having applied thereto a narrow strip $d$ punched at intervals, the punchings $e$ being interposed between the strips $a$ and $d$ as shown. The manner in which say a wire or cord can be incorporated in the tire to prevent stretching and hold the tire firmly on to the rim will be understood without illustration.

As will be obvious other forms of tire may be made embodying strips such as $a$ and $b$ or $a$ and $d$ assembled in the ways described. Similarly, a tire may be built up of a strip of crêpe rubber cured and rolled, the core thus formed being covered with a raw rubber in some such way as described and the whole subjected to any cold process cure and also if desired to a further warm vulcanization.

What I claim is:—

1. A tire comprising a strip of natural smoked sheet plantation rubber and a narrower strip of similar rubber secured thereto, the marginal portions of the wider strip being turned or rolled over the narrower strip so as to enclose the latter, the whole assuming an approximately circular shape in cross section, substantially as described.

2. A tire comprising a strip of natural smoked sheet plantation rubber, a narrower strip of similar rubber secured thereto, and a filling of cellular material, the marginal portions of the wider strip being turned or rolled over the narrower strip and over the cellular filling so as to enclose each of the latter, to form a tire approximately circular in cross section, substantially as described.

3. A tire comprising a strip of natural smoked sheet plantation rubber and a narrower strip of similar rubber secured thereto, the narrower strip being punched at intervals in its length and supported upon the wider strip by means of the punchings, substantially as described.

4. A tire comprising a core member, a narrow strip of natural smoked sheet plantation rubber resting thereon and a comparatively wide strip of similar material enclosing said core and said narrow strip with the united edges of said wide strip positioned diametrically opposite said narrow strip, substantially as described.

5. A tire comprising a core member, a narrow strip of natural smoked sheet plantation rubber resting thereon, said strip being perforated at intervals in its length, and a comparatively wide strip of similar rubber spaced therefrom, the marginal portions of the wide strip being turned or rolled to enclose said core and said narrow strip with the united edges of the wide strip positioned diametrically opposite the narrow strip, substantially as described.

6. A tire comprising a strip of natural smoked sheet plantation rubber and a narrower strip of similar rubber spaced therefrom, the narrower strip having spaced apertures therein and supported upon and within the wider strip, the marginal portions of the latter being turned or rolled over the former so as to enclose the same and form a tire approximately circular in cross section, substantially as described.

Signed at London, England, this 19th day of October 1923.

MORLAND MICHOLL DESSAU.